United States Patent
Furugori

(10) Patent No.: US 11,803,235 B2
(45) Date of Patent: Oct. 31, 2023

(54) DISPLAY CONTROLLING DEVICE AND DISPLAY CONTROLLING METHOD

(71) Applicant: Faurecia Clarion Electronics Co., Ltd., Saitama (JP)

(72) Inventor: Hiroshige Furugori, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 0 days.

(21) Appl. No.: 18/089,806

(22) Filed: Dec. 28, 2022

(65) Prior Publication Data

US 2023/0236664 A1 Jul. 27, 2023

(30) Foreign Application Priority Data

Jan. 27, 2022 (JP) ................................. 2022-010676

(51) Int. Cl.
```
G06F 3/01      (2006.01)
G06T 7/20      (2017.01)
G06T 7/70      (2017.01)
H04N 5/262     (2006.01)
```
(Continued)

(52) U.S. Cl.
CPC .............. *G06F 3/012* (2013.01); *B60K 35/00* (2013.01); *B60R 1/28* (2022.01); *G06F 3/013* (2013.01); *G06T 7/20* (2013.01); *G06T 7/70* (2017.01); *H04N 5/2628* (2013.01); *B60K 2370/152* (2019.05); *B60K 2370/788* (2019.05); *B60R 2300/105* (2013.01); *B60R 2300/20* (2013.01);
(Continued)

(58) Field of Classification Search
None
See application file for complete search history.

(56) References Cited

U.S. PATENT DOCUMENTS

2008/0012938 A1  1/2008  Kubota et al.
2009/0268025 A1* 10/2009  Hiramaki .............. B60K 35/00
                                              348/148

FOREIGN PATENT DOCUMENTS

EP       1962509 B1      12/2011
JP       2014-534697 A   12/2014
WO       2018/129310 A1   7/2018

OTHER PUBLICATIONS

The extended European Search Report mailed by European Patent Office dated Jun. 14, 2023 in corresponding European patent application No. 23153196.3-1012.

* cited by examiner

*Primary Examiner* — Stephen T. Reed
(74) *Attorney, Agent, or Firm* — IP BUSINESS SOLUTIONS, LLC

(57) ABSTRACT

A display controlling device includes a position detecting unit for detecting a position of the head of a driver and a position of an eye of the driver; a region adjusting unit for adjusting the position of a region, to be displayed on a display, in an outside image, depending on the detection result by the position detecting unit; and a display controlling unit for displaying, on the display, a region corresponding to the region of the position adjusted by the region adjusting unit. When there is a change in the position of the head so as to move in both the vertical direction in the crosswise direction of the vehicle, the region adjusting unit prevents adjustment of the position of the region to a position corresponding to the change, in the vertical direction, of the position of the eye, and adjusts the position of the region to a position corresponding to a change in the position of the eye in the crosswise direction and/or the front/rear direction.

8 Claims, 5 Drawing Sheets

(51) Int. Cl.
*B60R 1/28* (2022.01)
*B60K 35/00* (2006.01)
(52) U.S. Cl.
CPC .................. *B60R 2300/602* (2013.01); *G06T 2207/30201* (2013.01); *G06T 2207/30268* (2013.01)

[FIG. 1]
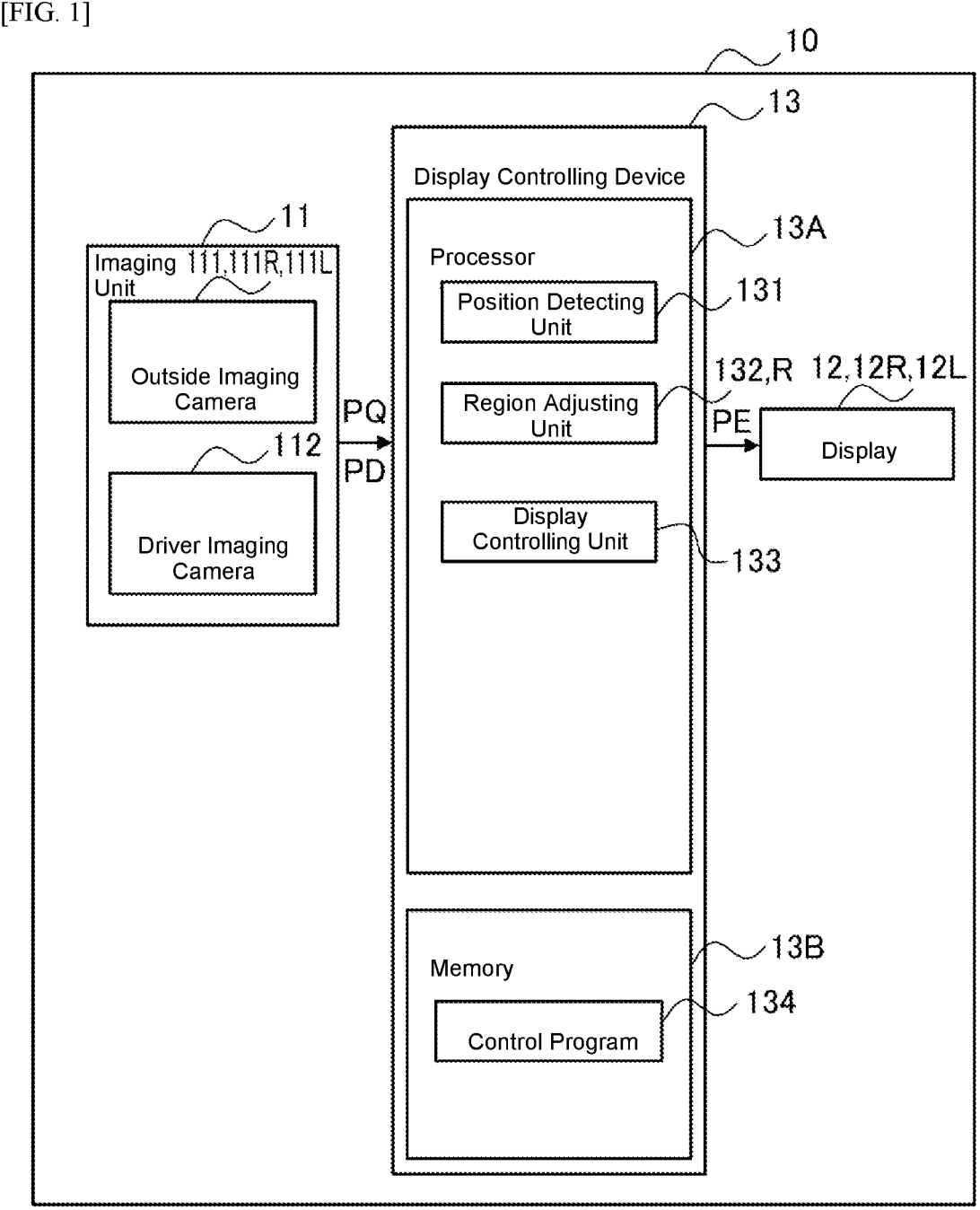

[FIG. 2]
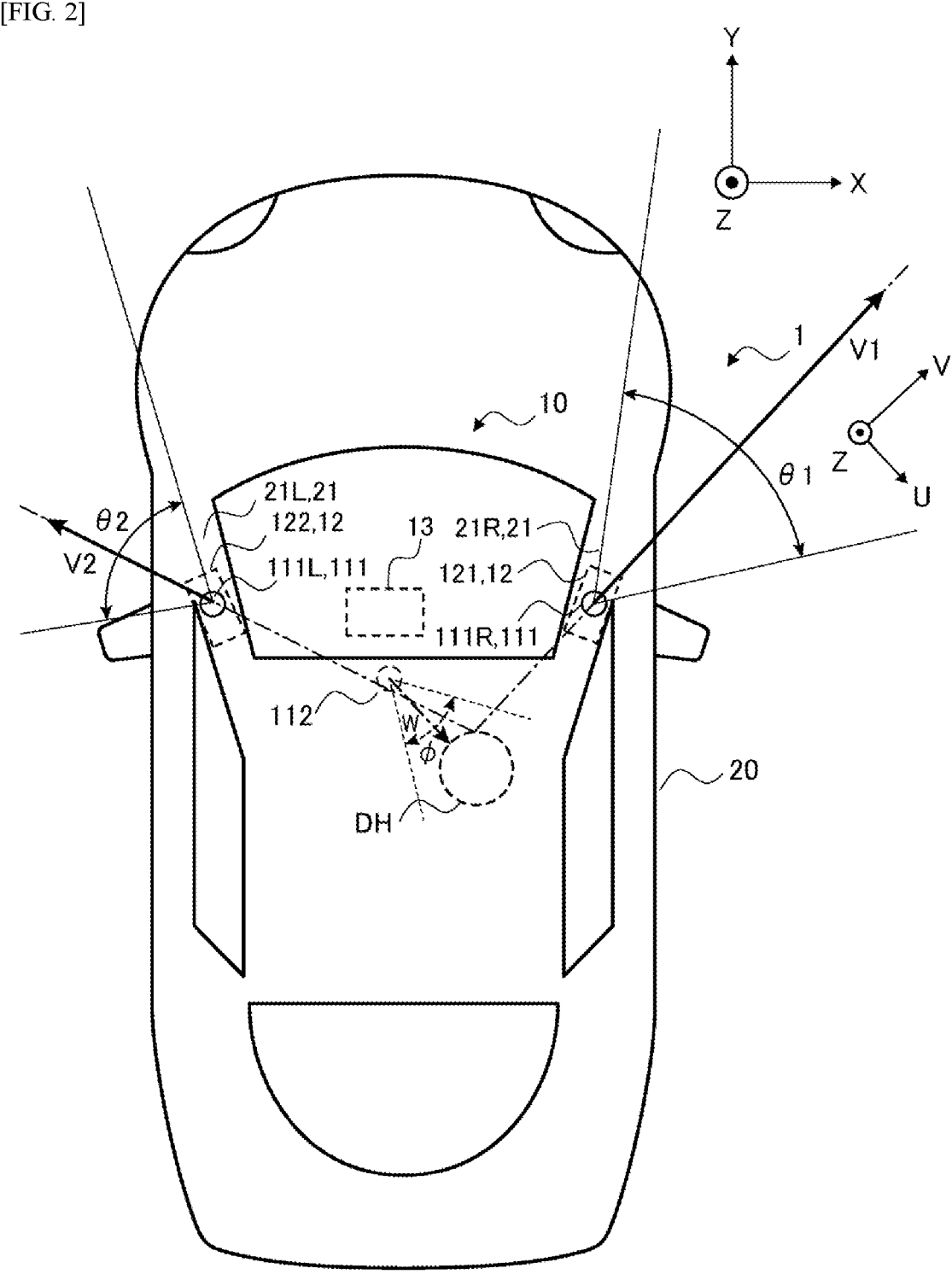

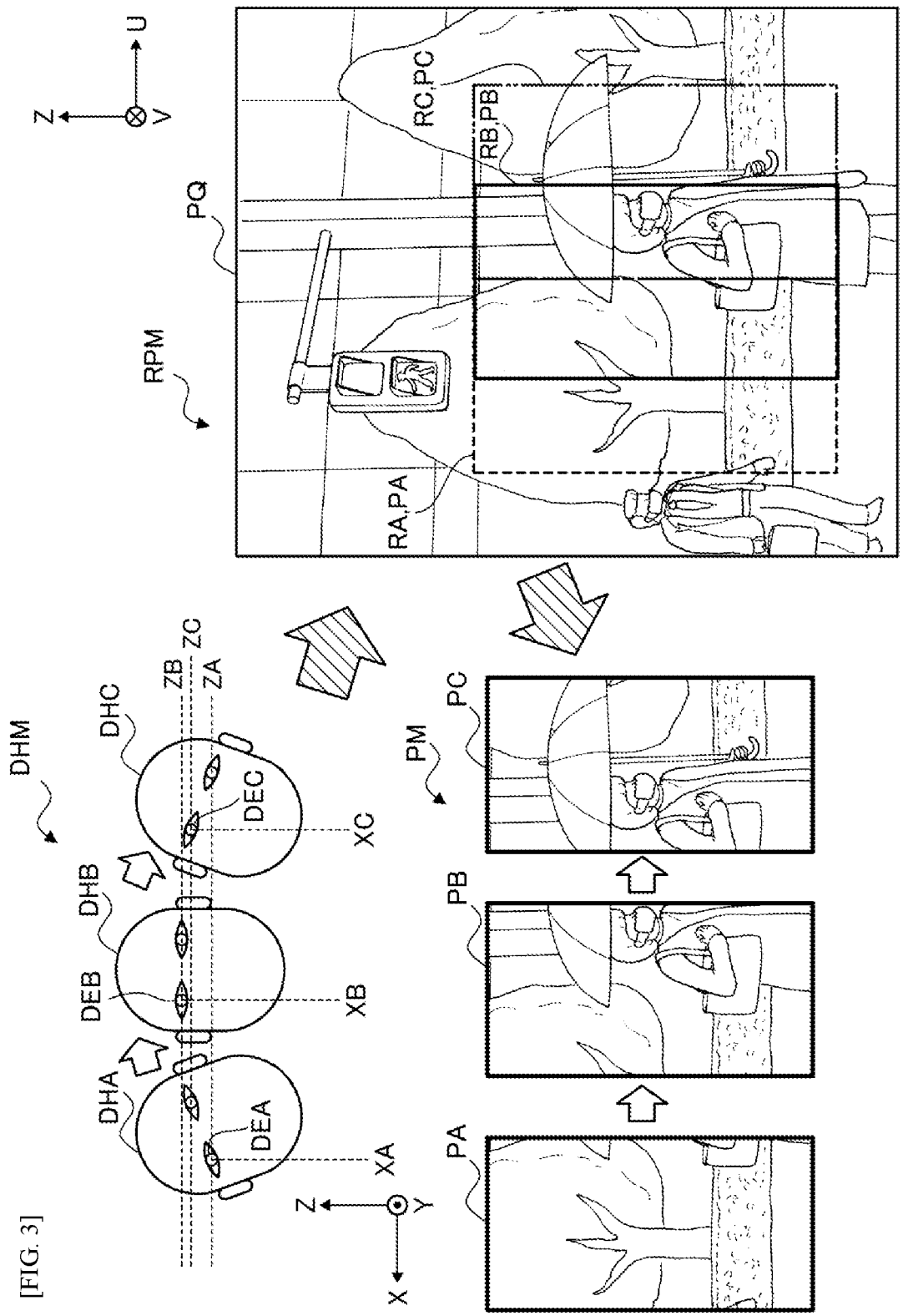
[FIG. 3]

[FIG. 4]
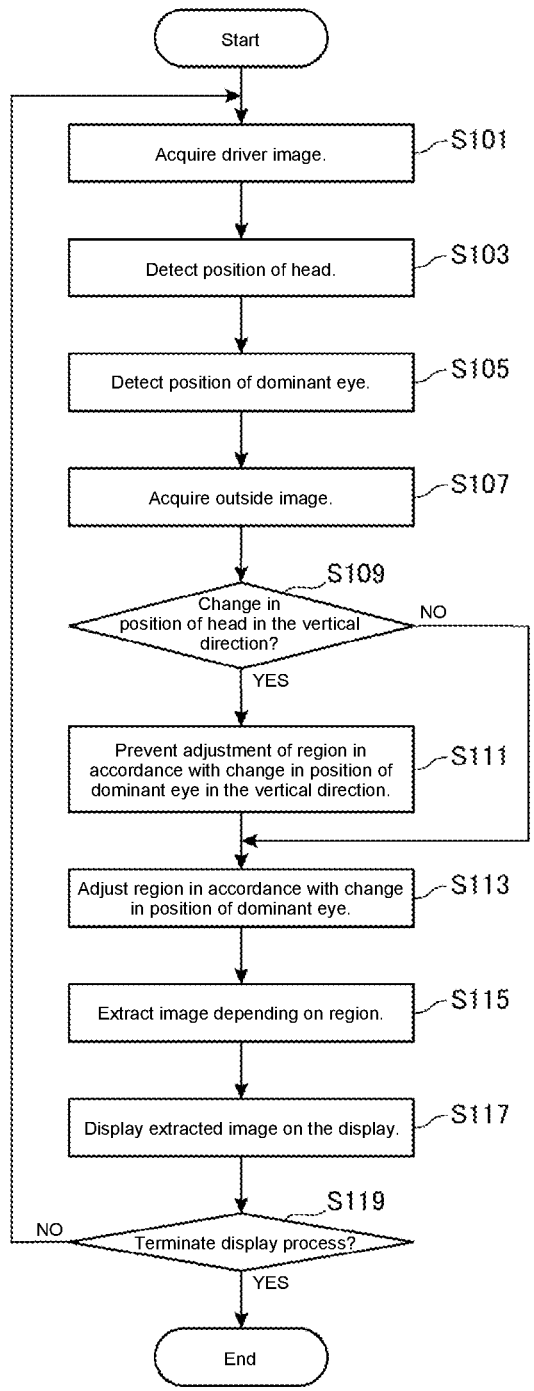

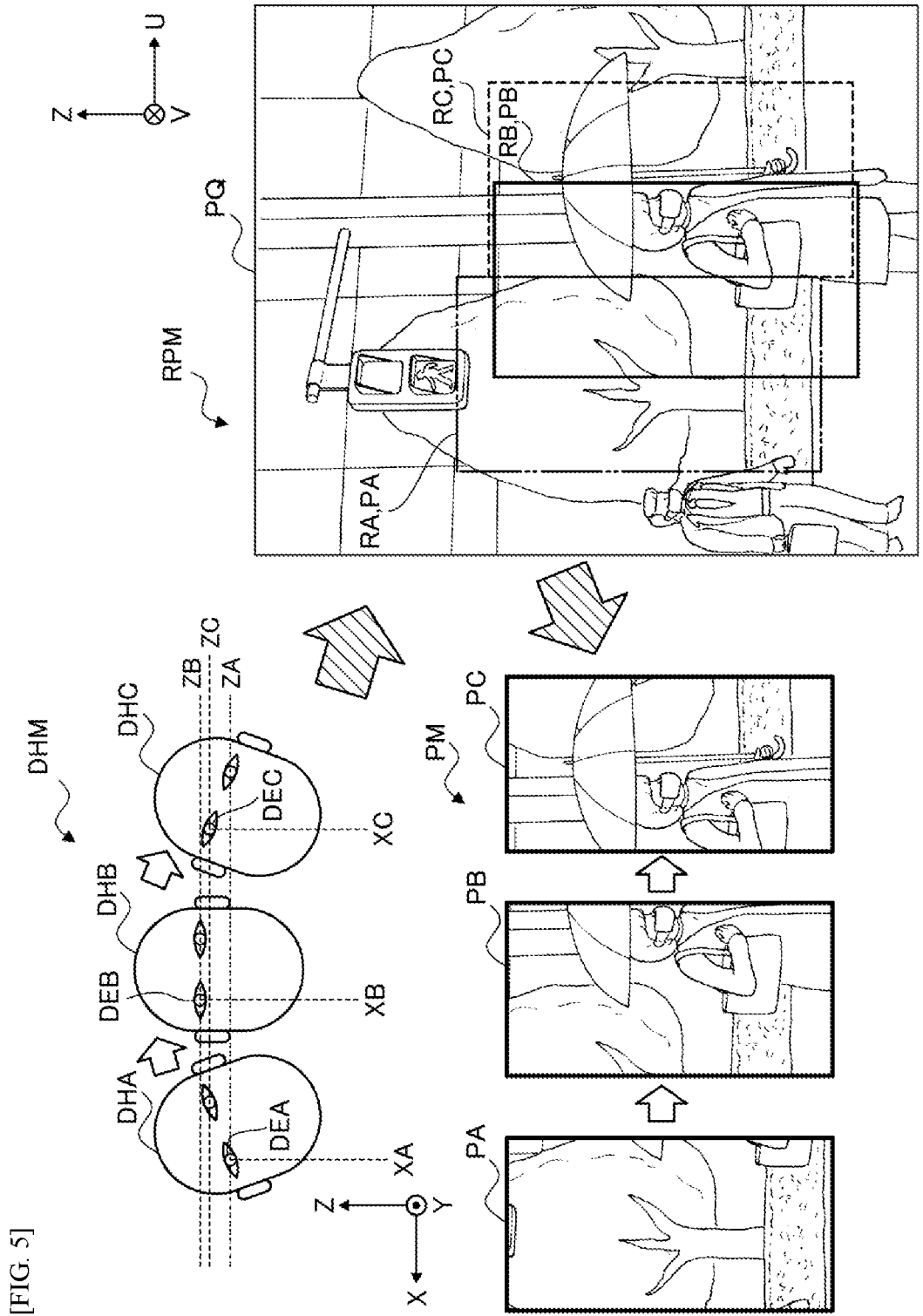
[FIG. 5]

DISPLAY CONTROLLING DEVICE AND DISPLAY CONTROLLING METHOD

CROSS-REFERENCE TO RELATED APPLICATIONS

The present application claims priority under 35 U.S.C. § 119 to Japanese Patent Application No. 2022-010676 filed on Jan. 27, 2022. The content of the application is incorporated herein by reference in its entirety.

BACKGROUND OF THE INVENTION

Field of the Invention

The present invention relates to a display controlling device and a display controlling method.

Description of the Related Art

Conventionally technologies for displaying an image to the outside of a vehicle have been disclosed.

Patent Document 1 discloses: "Cameras are mounted on the outside of the vehicle, corresponding to the positions of the display screens. A (plurality of) sensor(s) is oriented facing the driver of the vehicle to sense the positions of the eyes of the driver. An ECU for a display system analyzes the positions of the eyes of the driver to calculate a gaze line. An image from a camera is displayed on a display screen corresponding to the gaze line of the driver. The result is that the display system provides, to the driver, an image that appears as if the vehicle body were not there, without the vehicle obstructing the view by the driver."

PRIOR ART DOCUMENTS

Patent Documents

[Patent Document 1] Japanese Unexamined Patent Application Publication 2014-534697

Problem Solved by the Present Invention

In the display system disclosed in Patent Document 1, an image that appears as if the vehicle body were not there is displayed on a display. Given this, when the position of the eye of the driver moves in the vertical direction, a region of the image that is displayed on the display moves in the vertical direction so as to correspond with the position of the eye of the driver. However, in this case, there is the possibility that the driver will feel uncomfortable with the image that is displayed on the display.

The object of the present invention is to provide a display controlling device and display controlling method able to prevent the driver from feeling uncomfortable with the image that is displayed on the display.

SUMMARY OF THE INVENTION

In order to achieve the object according to above, a display controlling device according to the present application is, for example, a display controlling device for displaying, on a display that is mounted on the interior of a vehicle, an image of outside of the vehicle so as to appear as if looking through the vehicle body of the vehicle, comprising: a position detecting unit for detecting a position of the head of the driver and a position of an eye of the driver; a region adjusting unit for adjusting a position of a region, of the image of the outside of the vehicle, displayed on the display, depending on a detection result by the position detecting unit; and a display controlling unit for displaying, on the display, an image corresponding to the region at the position adjusted by the region adjusting unit, wherein: when the position of the head has changed so as to move in both the vertical direction and the crosswise direction of the vehicle, the region adjusting unit prevents adjustment of the position of the region to a position corresponding to the change, in the vertical direction, of the position of the eye, and adjusts the position of the region to a position corresponding to the change, in the crosswise direction, of the position of the eye.

Effects of the Invention

The ability to prevent the driver from feeling discomfort with the image that is displayed on the display when the actual position of the eye changes in the vertical direction, even if the driver did not intend to move in the vertical direction.

BRIEF DESCRIPTION OF THE DRAWINGS

FIG. 1 is a diagram showing an example of a structure of an onboard system that includes a display controlling device according to the present invention.

FIG. 2 is a plan view showing an example of the arrangement of the onboard system according to the present embodiment.

FIG. 3 is a diagram showing a specific example of a process in the display controlling device according to the present embodiment.

FIG. 4 is a flowchart showing an example of a process in a display controlling device according to the present embodiment.

FIG. 5 is a diagram showing a specific example of a process in a conventional display controlling device.

DETAILED DESCRIPTION OF THE INVENTION

Embodiments according to the present invention will be explained below in reference to the drawings.

The structure of an onboard system 10 that includes the display controlling device 13 according to the present embodiment will be explained first in reference to FIG. 1. FIG. 1 is a diagram showing an example of a structure for an onboard system 10 that includes a display controlling device 13 according to the present embodiment.

As illustrated in FIG. 1, the onboard system 10 comprises an imaging unit 11, a display 12, and a display controlling device 13.

The imaging unit 11 comprises an outside imaging camera 111 and a driver imaging camera 112.

The outside imaging camera 111 captures an image of outside of the vehicle 1, to produce an outside image PQ. The outside imaging camera 111 outputs the outside image PQ to the display controlling device 13. The driver imaging camera 112 captures an image of the driver to generate a driver image PD. The driver imaging camera 112 outputs the driver image PD to the display controlling device 13.

Each of these cameras comprises: an image sensor such as a CCD (Charge-Coupled Device), CMOS (Complementary Metal-Oxide-Semiconductor), or the like, with a data processing circuit for generating a captured image from the image sensors, and a data transmitting circuit for outputting the captured image to the display controlling device 13.

A display 12 is mounted in the interior of the vehicle 1. For example, The display 12 comprises an LCD (Liquid Crystal Display), or the like. The display 12 displays an image that is a part of the outside image PQ in accordance with an instruction from the display controlling device 10. The display 12 displays an image PE, of the outside image PQ, corresponding to a region R of a position adjusted by the display controlling device 10. The region R will be explained in reference to FIG. 3.

The display controlling device 13 controls the respective operations of the imaging unit 11 and the display 12. The display controlling device 13 displays the image PE of the region R on the display 12. The image PE of the region R is a part of the outside image PQ so as to appear as if one is looking through the vehicle body 20 of the vehicle 1.

The display controlling device 13 acquires the outside image PQ and the driver image PD from the imaging unit 11. The display controlling device 13 displays, on the display 12, the image PE of the region R of a part of the outside image PQ.

After explaining FIG. 2 for the display controlling device 13, we will return again to explaining FIG. 1.

The layout of the onboard system 10 according to the present embodiment will be explained next in reference to FIG. 2. FIG. 2 is a plan view showing an example of the layout of the onboard system 10 according to the present embodiment.

An X axis, a Y axis, and a Z axis are shown in FIG. 2. The X axis, the Y axis, and the Z axis are mutually perpendicular. The X axis is parallel to the crosswise direction of the vehicle 1, the Y axis is parallel to the front/rear direction of the vehicle 1, and the Z axis is parallel to the vertical direction of the vehicle 1. The positive direction of the X axis is the direction to the right of the vehicle 1, the positive direction of the Y axis is the direction to the front of the vehicle 1, and the positive direction of the Z axis is the direction to the top of the vehicle 1.

As illustrated in FIG. 2, the vehicle 1 includes the aforementioned onboard system 10 and a vehicle body 20. The onboard system 10 is installed in the vehicle body 20 of the vehicle 1.

The vehicle body 20 is equipped with A-pillars 21. The A-pillars 21 include a right A-pillar 21R and a left A-pillar 21L.

The outside imaging cameras 111 include a right outside imaging camera 111R and a left outside imaging camera 111L. For example, the right outside imaging camera 111R is mounted on the outer surface of the right A-pillar 21R. For example, the left outside imaging camera 111L is mounted on the outer surface of the left A-pillar 21L. For example, the driver imaging camera 112 is mounted in the vicinity of the rear-view mirror.

The display 12 includes a right display 12R and a left display 12L. The right display 12R is mounted on the inner surface of the right A-pillar 21R. The left display 12L is mounted on the inner surface of the left display 12L.

For example, the display controlling device 13 is mounted in the dashboard.

An imaging direction V1 indicates an imaging direction of the right outside imaging camera 111R. For example, the imaging direction V1 matches the direction from the position of an eye DE (not shown) of the driver toward the right outside imaging camera 111R. The imaging range θ1 indicates the imaging range of the right outside imaging camera 111R.

A U axis, a V axis, and a Z axis are shown in FIG. 2. The U axis, V axis, and Z axis specify a position in the outside image PQ imaged by the right outside imaging camera 111R. The Z axis is parallel to the vertical direction of the vehicle body 20. The V axis is, for example, parallel to the imaging direction V1, and the U axis is the direction that is perpendicular to the Z axis and the V axis. The positive direction of the U axis is the direction to the right of the gaze line of the driver, and the positive direction of the V axis is the direction to the back of the gaze line of the driver. Note that insofar as the V axis is not greatly divergent from the gaze line of the driver, it need not necessarily be the imaging direction V1. For example, the V axis may be the direction directly toward the surface, in the display 12, wherein the image is displayed, or may be the direction that is parallel to a straight line between the position of the eye DE of the driver and the center of the surface, in the display 12, wherein the image is displayed.

An imaging direction V2 indicates an imaging direction of the left outside imaging camera 111L. The imaging direction V2 coincides with, for example, the direction from the position of an eye DE (not shown) of the driver toward the left outside imaging camera 111L. The imaging range θ2 indicates the imaging range of the left outside imaging camera 111L. The V axis, U axis, and Z axis may be provided corresponding to the imaging direction V2.

The head DH of the driver is shown in FIG. 2. The imaging direction W indicates the imaging direction of the driver imaging camera 112. The imaging range φ indicates the imaging range of the driver imaging camera 112. The imaging range φ includes the head DH of the driver.

Returning to FIG. 1, the structure of the display controlling device 13 according to the present embodiment will be explained next.

The display controlling device 13 comprises a processor 13A and a memory 13B. The processor 13A is structured from a CPU (Central Processing Unit), an MPU (MicroProcessing Unit), or the like. The memory 13B is structured from a ROM (Read-Only Memory), a RAM (Random Access Memory), or the like. Moreover, the memory 13B may comprise a storage device such as an HDD (Hard Disk Drive), an SSD (Solid State Drive), or the like.

The display controlling device 13 comprises, in addition to these devices: an interface circuit for connecting to sensors, peripheral devices, and the like; and an onboard network communication circuit for communicating with other onboard systems through an onboard network. In the display controlling device 13, a variety functional structures is achieved through a processor 13A executing a control program 134 that is stored in the memory 13B.

For example, the display controlling device 13 is structured from, an ECU (Electronic Control Unit).

For example, the display controlling device 13 may be structured through an integrated circuit. Integrated circuits include LSIs, ASICs (Application Specific Integrated Circuits), and PLDs (Programmable Logic Devices). PLDs include, for example, FPGAs (Field-Programmable Gate Arrays). Moreover, analog circuits may also be included in a portion of the structure of the integrated circuit, and a processor and an integrated circuit may be combined. The combination of a processor and an integrated circuit is called a microcontroller (MCU), an SoC (system-on-a-chip), a system LSI, a chipset, or the like.

The display controlling device 13 comprises a position detecting unit 131, a region adjusting unit 132, and a display controlling unit 133. Specifically, the processor 13A, through executing a control program 134 that is stored in the memory 13B, functions as the position detecting unit 131, the region adjusting unit 132, and the display controlling unit 133.

The position detecting unit 131 acquires the driver image PD from the driver imaging camera 112. Moreover, the position detecting unit 131 detects the position of the head DH of the driver and the position of the eye DE of the driver based on the driver image PD. For example, the position detecting unit 131 executes image processing on the driver image PD to detect the position of the head DH of the driver and the position of the eye DE of the driver.

In the present embodiment, a case will be explained wherein the position detecting unit 131 detects the position of the dominant eye of the driver as the position of the eye DE of the driver. The explanation will be for a case wherein the right eye of the driver is set as the dominant eye of the driver.

The region adjusting unit 132 acquires the outside image PQ from the outside imaging camera 111. The region adjusting unit 132 adjusts the position of the region R, from the outside image PQ that has been captured by the outside imaging camera 111, to be displayed on the display 12 in accordance with the detection result by the position detecting unit 131.

For example, when the position of the head DH changes so as to move in both the vertical direction of the vehicle 1 and the crosswise direction of the vehicle 1, the region adjusting portion unit 132 executes the following process. The position of the head DH also changes so as to move in both the vertical direction of the vehicle 1 and the front/rear direction of the vehicle 1, the region adjusting unit 132 executes the following process. Specifically, the region adjusting unit 132 adjusts the position of the region R to a position corresponding to the change of the position of the eye DE in the crosswise direction and/or the front/rear direction, while preventing an adjustment of the position of the region R to a position corresponding to the change in the vertical direction in the position of the eye DE. In other words, the region adjusting unit 132 moves the position of the region R in the crosswise direction and/or the front/rear direction, without moving in the vertical direction.

Note that the crosswise direction corresponds to the X-axial direction in FIG. 2, the front/rear direction corresponds to the Y-axial direction in FIG. 2, and the vertical direction corresponds to the Z-axial direction in FIG. 2.

For example, when the position of the head DH has changed so as to move in both the vertical direction and the crosswise direction, the region adjusting unit 132 executes the following process. Specifically, the region adjusting unit 132 adjusts the position of the region R to a position corresponding to the change of the position of the eye DE in the crosswise direction while preventing an adjustment of the position of the region R to a position corresponding to the change of the position of the eye DE in the vertical direction.

This case will be explained further in reference to FIG. 3.

Moreover, when the position of the head DH has changed so as to move in both the vertical direction and the front/rear direction, the region adjusting unit 132 executes the following process. Specifically, the region adjusting unit 132 adjusts the position of the region R to a position corresponding to the change of the position of the eye DE in the front/back direction while preventing an adjustment of the position of the region R to a position corresponding to the change of the position of the eye DE in the vertical direction.

For example, when the position of the eye DE has moved in the forward direction, which is the positive Y-axial direction, the region adjusting unit 132 adjusts the position of the region R in the positive U-axial direction. For example, if the position of the eye DE has moved in the rearward direction which is the negative Y-axial direction, the region adjusting unit 132 adjusts the position of the region R in the negative U-axial direction.

For example, if the driver leans forward, the position of the eye DE will move in the forward direction, which is the positive Y-axial direction. Moreover, if the driver leans toward the rear, the position of the eye DE will move in the rearward direction, which is the negative Y-axial direction.

The display controlling unit 133 displays an image PE on the display 12. the image PE corresponds to the region R for which the position has been adjusted by the region adjusting unit 132. The display controlling unit 133 extracts an image PE that corresponds to the region R from the outside image PQ that has been captured by the right outside imaging camera 111R. And the display controlling unit 133 displays the extracted image PE on the right display 12R. Moreover, the display controlling unit 133 extracts an image PE that corresponds to the region R from the outside image PQ that has been captured by the left outside imaging camera 111L. And the display controlling unit 133 displays the extracted image PE on the left display 12L.

A specific example of a process of the display controlling device will be explained next in reference to FIG. 3 and FIG. 5.

FIG. 3 is a diagram showing a specific example of a process in the display controlling device 13 according to the present embodiment. FIG. 5 is a diagram showing a specific example of a process in a conventional display controlling device.

The conventional display controlling device differs from the display controlling device 13 according to the present embodiment in the points according to below. That is, when there is a change in the position of the head DH so as to move in both the vertical direction and the crosswise direction, the region adjusting unit 132 of the display controlling device 13 according to the present embodiment prevents an adjustment of the position of the region R to a position corresponding to the change of the position of the eye DE in the vertical direction. In contrast, with the conventional display controlling device, the position of the region R is adjusted to the position corresponding to the change in the position of the eye DE in the vertical direction.

The method for adjusting the position of the region R when there is a change in the position of the head DH of the driver is explained in a case wherein the outside image PQ captured by the right outside imaging camera 111R is a still image in FIG. 3 and FIG. 5. On the other hand, when the display controlling device 13 according to the present embodiment is actually used, the outside image PQ is a video that is generated at a predetermined frame rate. For example, the frame rate may be 60 FPS.

In FIG. 3 and FIG. 5, a case is explained wherein a part of the outside image PQ that has been captured by the right outside imaging camera 111R is displayed on the right display 12R. FIG. 3 and FIG. 5 each include DHM that shows the position of the head, a RPM that shows the position of the region, and PM that shows the image. DHM that shows the position of the head shows the change in the position of the head DH that is detected based on the driver image PD.

RPM that shows the position of the region shows the position of the region R, in the outside image PQ that has been captured by the right outside imaging camera 111R, which has been adjusted by the conventional display controlling device or the display controlling device 13. PM that shows the image shows the changes in the image that is displayed on the right display 12R by the conventional display controlling device or the display controlling device 13.

A specific example of a process in the conventional display controlling device will be explained first in reference to FIG. 5.

As showed in DHM that shows the position of the head in FIG. 5, the position of the head DH of the driver moves from the position DHA through the position DHB to the position DHC. The position DHA is the position of the head DH when the driver has tilted the head DH toward the right (the positive X-axial direction in FIG. 2). The position DHB is the position of the head DH when the driver has not tilted the head DH. The position DHC is the position of the head DH when the driver has tilted the head DH toward the left (the negative X-axial direction in FIG. 2).

The position DEA shows the position of the right eye, which is the dominant eye of the driver, when the head DH is at the position DHA. The (X, Y, Z) coordinates of the position DEA are (XA, Y, ZA). The position DEB shows the position of the right eye, which is the dominant eye of the driver, when the head DH is at the position DHB. The (X, Y, Z) coordinates of the position DEB are (XB, Y, ZB). The position DEC shows the position of the right eye, which is the dominant eye of the driver, when the head DH is at the position DHB. The (X, Y, Z) coordinates of the position DEC are (XC, Y, ZC). Note that the value of the Y-coordinate does not change, or the amount of change is no greater than a predetermined threshold value, an amount of change that is negligible. The coordinate XA, the coordinate XB, and the coordinate XC satisfy the following Expression (1):

$$XA>XB>XC \quad (1).$$

Additionally, the coordinate ZA, the coordinate ZB, and the coordinate ZC satisfy the following Expression (2):

$$ZB>ZC>ZA \quad (2).$$

As shown by RPM that shows the position of the region, in FIG. 5, when the head DH is at the position DHA, the display controlling device adjusts the region R to the region RA of the outside image PQ. When the head DH is at the position DHB, the display controlling device adjusts the region R to the region RB of the outside image PQ. When the head DH is at the position DHC, the display controlling device adjusts the region R to the region RC of the outside image PQ.

Per Expression (1) and Expression (2), the region RA is disposed at a position to the upper left of the region RB, and the region RC is disposed at the upper right of the region RB. Moreover, the region RA is disposed further to the top than the region RC. The region RA, region RB, and region RC each corresponds to an example of a region R. When the position of the head DH, in a state wherein the head DH of the driver is not tilted, is at the position DHB, the region R is adjusted to the region RB. When the head DH of the driver is tilted to the right (the positive X-axial direction in FIG. 2), the region R is adjusted so as to move in the negative U-axial direction in FIG. 2, and so as to move in the positive Z-axial direction (region RA). Additionally, when the head DH of the driver is tilted to the left (the negative X-axial direction in FIG. 2), the region R is adjusted so as to move in the positive U-axial direction in FIG. 2, and so as to move in the positive Z-axial direction (region RC).

As shown in PM that shows the images in FIG. 5, when the head DH is at the position DHA, the display controlling device displays the image PA of the region RA in the right display 12R. When the head DH is at the position DHB, the display controlling device displays the image PB of the region RB in the right display 12R. When the head DH is at the position DHC, the display controlling device displays the image PC of the region RC in the right display 12R. The image PA, the region RB, and the image PC each correspond to an example of an image PE.

In this way, the conventional display controlling device moves the region R of the image that is displayed in the right display 12R so as to correspond to the position of the eye DE of the driver in the vertical direction when the position of the eye DE of the driver moves in the vertical direction.

However, the driver may change the actual position of the eye DE in the vertical direction without intending to move in the vertical direction. In this case, the driver may feel uncomfortable with the image PE that is displayed on the display 12 due to the movement in the vertical direction. Since the region R of the image displayed in the right display 12R so as to correspond to the position of the eye DE of the driver.

Moreover, it is difficult that the timing of the movement of the region R of the image that is displayed on the right display 12R in the vertical direction matches the timing of the movement of the position of the eye DE in the vertical direction. To detect the position of the eye DE and to extract the image of the region R to display on the right display 12R requires processing time. Because of this, the driver may feel uncomfortable with the image PE that is displayed on the display 12.

In order to eliminate this problem, the region adjusting unit 132 of the display controlling device 13 according to the present embodiment prevents adjustment of the position of the region R to a position corresponding to the change, in vertical direction, of the position of the eye DE.

A specific example of a process in the display controlling device 13 will be explained next in reference to FIG. 3. FIG. 3 is a diagram showing a specific example of a process in the display controlling device 13.

As with FIG. 5, FIG. 3 includes DHM that shows the position of the head, RPM that shows the position of the region, and PM that shows the image. DHM that shows the position of the head, shown in FIG. 3, is identical to DHM that shows the position of the head, shown in FIG. 5.

As shown in RPM that shows the region position in FIG. 3, when the head DH is at the position DHA, the region adjusting unit 132 adjusts the region R to the region RA of the outside image PQ. When the head DH is at the position DHB, the region adjusting unit 132 adjusts the region R to the region RB of the outside image PQ. When the head DH is at the position DHC, the region adjusting unit 132 adjusts the region R to the region RC of the outside image PQ.

Referencing FIG. 5, per Expression (1) and Expression (2), above, the region RA is disposed at a position to the right (the negative U-axial direction in FIG. 2) of the region RB, and the region RC is disposed at a position to the left (the positive U-axial direction in FIG. 2) of the region RB.

When the position of the head DH, in a state wherein the head DH of the driver is not tilted, is the position DHB, the region R is adjusted to the region RB. When the head DH of the driver is tilted to the right (the positive X-axial direction in FIG. 2), the region R is adjusted so as to move in the negative U-axial direction in FIG. 2 and movement in the Z-axial direction is prevented (region RA). Additionally, when the head DH of the driver is tilted to the left (the negative X-axial direction in FIG. 2), the region R is adjusted so as to move in the positive U-axial direction in FIG. 2, and movement in the Z-axial direction is prevented (region RC).

As shown in FIG. 3 in the part PM that shows the image, the display controlling unit 133 displays the image PA of the region RA on the right display 12R when the head DH is at the position DHA. The display controlling unit 133 displays the image PB of the region RB in the right display 12R hen the head DH is at the position DHB. When the head DH is at the position DHC, the display controlling unit 133 displays the image PC of the region RC in the right display 12R.

The region adjusting unit 132 of the display controlling device 13 executes the following process when the position of the head DH changes so as to move in the vertical direction and in crosswise direction. Specifically, the region adjusting unit 132 adjusts the position of the region R to a position corresponding to the change of the position of the eye DE in the crosswise direction while preventing an adjustment of the position of the region R to a position corresponding to the change of the position of the eye DE in the vertical direction. The region adjusting unit 132 can avoid adjusting the position of the region T to a position corresponding to the position of the eye DE in the vertical direction.

This makes it possible to prevent the driver from feeling uncomfortable with the image PE that is displayed on the display 12. Furthermore, because adjustment of the position of the region R to a position corresponding to the change in the vertical direction is prevented, this can shorten the processing time.

An example of a process in the display controlling device 13 according to the present embodiment will be explained next in reference to FIG. 4. FIG. 4 is a flowchart showing an example of a process in the display controlling device 13 according to the present embodiment. Note that the explanation in FIG. 4 is for a case wherein the dominant eye of the driver is set in advance to the right eye or left eye.

As illustrated in FIG. 4, first, in Step S101, the position detecting unit 131 acquires the driver image PD from the driver imaging camera 112.

Next, in Step S103, the position detecting unit 131 detects the position of the head DH of the driver based on the driver image PD.

Next, in Step S105, the position detecting unit 131 detects the position of the dominant eye DE of the driver based on the driver image PD.

Next, in Step S107, the region adjusting unit 132 acquires the outside image PQ from the outside imaging camera 111.

Next, in Step S109, the region adjusting unit 132 determines whether or not there has been a change, in the vertical direction, of the position of the head DH of the driver that was detected by the position detecting unit 131.

If the evaluation by the region adjusting unit 132 is that the position of the head DH has not changed in the vertical direction (Step S109: NO), processing advances to Step S113. If the evaluation by the region adjusting unit 132 is that the position of the head DH has changed in the vertical direction (Step S109: YES), processing advances to Step S111.

Given this, in Step S111, the region adjusting unit 132 prevents an adjustment of the position of the region R depending on the change in position, in the vertical direction, of the dominant eye of the driver.

Next, in Step S113, the region adjusting unit 132 adjusts the position of the region R in accordance with the change of the position of the dominant eye of the driver except for in the vertical direction (that is, in the crosswise direction and in the front/rear direction).

Next, in Step S115, the display controlling unit 133 extracts, from the outside image PQ that has been captured by the outside imaging camera 111, the image PE that corresponds to the region R of the position adjusted by the region adjusting unit 132. Next, in Step S117, the display controlling unit 133 displays, on the display 12, the image PE that was extracted in Step S115.

Next, in Step S119, the display controlling device 13 determines whether or not to terminate the display process. The "display process" is the process for displaying the image PE on the display 12, that is, the process that is structured from Step S101 through Step S117 in FIG. 4. The display controlling device 13, for example, receives an operation from the driver and determines whether or not to terminate the display process depending on the operation that has been received.

If the evaluation is that the display process is not to be terminated (Step S119: NO), processing returns to Step S101. If the evaluation is to terminate the display process (Step S119: YES), the process is then terminated.

Step S103 and Step S105 correspond to examples of a "detecting step." Step S113 corresponds to an example of an "adjusting step." Step S117 corresponds to an example of a "displaying step."

Note that when the driver boards the vehicle and sits in the driver seat, the process described in FIG. 4 is not executed. Specifically, the driver boards the vehicle and sits in the driver seat, and when the region adjusting unit 132 has set a reference position for the region R matching the height of the body or eye of the driver, imaged by the driver imaging camera 112, the process described in FIG. 4 is not executed. Thus the present invention does not interfere with setting the reference position for the region R to match the body of the driver.

As explained above in reference to FIG. 1 through FIG. 5, the display controlling device 13 according to the present embodiment is a display controlling device 13 for displaying an outside image PQ, which is an image to the outside of the vehicle 1, as if seeing through the vehicle body 20 of the vehicle 1, on a display 12 that is mounted in the interior of the vehicle 1, comprising: a position detecting unit 131 for detecting the position of the head DH of the driver and the position of an eye DE of the driver; a region adjusting unit 132 for adjusting the position of the region R, to be displayed on the display 12, from the outside image PQ depending on the detection results by the position detecting unit 131; and a display controlling unit 133 for displaying, on the display 12, an image PE that corresponds to the region R for which the position has been adjusted by the region adjusting unit 132, wherein: when there is a change in the position of the head DH so as to move in the vertical direction and crosswise direction of the vehicle 1, the region adjusting unit 132 prevents an adjustment of the position of the region R to a position corresponding to the change, in the vertical direction, of the position of the eye DE, and adjusts the position of the region R to a position that corresponds to the change, in the crosswise direction, of the position of the eye DE.

When the position of the head DH has changed so as to move in both the vertical direction of the vehicle 1 and the crosswise direction of the vehicle 1, the region adjusting unit 132 executes the following process. Specifically, the region adjusting unit 132 adjusts the position of the region R to a position corresponding to the change of the position of the eye DE in the crosswise direction while preventing an adjustment of the position of the region R to a position corresponding to the change of the position of the eye DE in the vertical direction. In other words, the region adjusting unit 132 moves the position of the region R in the crosswise direction, without moving it in the vertical direction.

The result is that this can prevent the driver from feeling the discomfort with the image PE that is displayed on the display 12 that would be caused by the movement of the position of the region R in the vertical direction.

Moreover, in the display controlling device 13, when the position of the head DH has changed so as to move in both the vertical direction and the front/rear direction of the vehicle 1, the region adjusting unit 132 adjusts the position of the region R to a position corresponding to the change of the position of the eye DE in the front/rear direction while preventing an adjustment of the position of the region R to a position corresponding to the change of the position of the eye DE in the vertical direction.

The result is that this can prevent the driver from feeling the discomfort with the image PE that is displayed on the display 12 that would be caused by the movement of the position of the region R in the vertical direction.

Moreover, in the display controlling device 13, the position detecting unit 131 detects, as the position of the eye DE of the driver, the position of the dominant eye of the driver.

Through this, the region adjusting unit 132 adjusts the position of the region R to a position that corresponds to a change in the position of the dominant eye in the crosswise direction and/or the front/back direction. This enables the position of the region R to be adjusted properly. The result is the ability to display the image PE appropriately on the display 12.

Moreover, in the display controlling device 13, when the position of the head DH has changed so as to move in both the vertical direction of the vehicle 1 and the crosswise direction of the vehicle 1, the region adjusting unit 132 adjusts the position of the region R to a position corresponding to the change of the position of the eye DE in the crosswise direction while preventing an adjustment of the position of the region R to a position corresponding to the change of the position of the eye DE in the vertical direction.

That is, when there has been a change in the position of the head DH so as to move in the vertical direction of the vehicle 1 and in the crosswise direction of the vehicle 1, the region adjusting unit 132 prevents the adjustment of the position of the region R to a position corresponding to the change, in the vertical direction, of the position of the eye DE. The result is that this can prevent the driver from feeling the discomfort with the image PE that is displayed on the display 12 that would be caused by the movement of the position of the region R in the vertical direction when there has been a change in the position of the head DH so as to move in the vertical direction of the vehicle 1 and in the crosswise direction of the vehicle 1.

Moreover, in the display controlling device 13, when the position of the head DH has changed so as to move in both the vertical direction of the vehicle 1 and the front/back direction of the vehicle 1, the region adjusting unit 132 adjusts the position of the region R to a position corresponding to the change of the position of the eye DE in the front/back direction while preventing an adjustment of the position of the region R to a position corresponding to the change of the position of the eye DE in the vertical direction.

That is, when there has been a change in the position of the head DH so as to move in the vertical direction of the vehicle 1 and in the front/back direction of the vehicle 1, the region adjusting unit 132 prevents the adjustment of the position of the region R to a position corresponding to the change, in the vertical direction, of the position of the eye DE. The result is that this can prevent the driver from feeling the discomfort with the image PE that is displayed on the display 12 that would be caused by the movement of the position of the region R in the vertical direction when there has been a change in the position of the head DH so as to move in the vertical direction of the vehicle 1 and in the front/back direction of the vehicle 1.

Moreover, in the display controlling device 13, the vehicle body 20 includes A-pillars 21, and the display 12 includes a right display 12R and a left display 12L that are mounted on the A-pillars 21.

Through this, the right display 12R and the left display 12L are mounted on the A-pillars 21, enabling the image PE to be displayed as if it is possible to see through the A-pillars 21. This makes it possible to prevent the A-pillars 21 from blocking the field of view of the driver.

Moreover, in the display controlling device 13, when the driver boards the vehicle 1, the region adjusting unit 132 does not prevent adjustment of the position of the front region R to a position corresponding to the change, in the vertical direction, of the position of the eye DE.

Through this, when the driver has boarded the vehicle 1, the region adjusting unit 132 adjusts the position of the region R to a position that corresponds to the change of the position of the eye DE in the vertical direction. This enables the position of the region R to be adjusted appropriately when the driver has boarded the vehicle 1.

Moreover, a display controlling method according to the present embodiment is a display controlling method for a display controlling device 10 to display the outside image PQ, which is an image of the outside of the vehicle 1, on a display 12 that is mounted within the vehicle 1, so as to appear as if one is looking through the vehicle body 20 of the vehicle 1, including: a detecting step for detecting a position of the head DH of the driver and a position of an eye DE of the driver; an adjusting step for adjusting the position of the region R, which is to be displayed on the display 12, in the outside image PQ in accordance with a detection result from the detecting step; and a displaying step for displaying, on the display 12, an image PE that corresponds to the region R for which the position has been adjusted in the adjusting step, wherein: when there is a change in the position of the head DH so as to move in both the vertical direction and the crosswise direction of the vehicle 1, then, in the adjusting step, adjustment of the position of the region R to a position corresponding to the change, in the vertical direction, of the position of the eye DE is prevented, and the position of the region R is adjusted to a position that corresponds to the change, in the crosswise direction, of the position of the eye DE.

As a result, the display supporting method according to the present embodiment has the same effects as the display controlling device 13 according to the present embodiment.

The embodiment according to above is no more than an illustration of one form of the present invention, and the present invention may be modified and applied appropriately in a range that does not deviate from the spirit and intent thereof.

For example, for ease in understanding the present invention, FIG. 1 is a diagram wherein the structural elements are shown partitioned into the main processing details, and the structural elements may be partitioned into more structural elements depending on the processing details. Moreover, the partitioning may be such that more processes are carried out by a single structural element.

Moreover, the processes in any of the structural elements may be executed in a single hardware or executed by a plurality of hardware. Moreover, the processes of each structural element may be achieved by a single program, or by a plurality of programs.

Moreover, in FIG. 1 the display controlling device 13 may be integrated with the imaging unit 11 and/or the display 12.

Furthermore, while in the present embodiment a position detecting unit 131, a region adjusting unit 132, and a display controlling unit 133 are provided, there is no limitation thereto. A server device that is connected to the display controlling device 13 so as to enable communication through a network such as the Internet may provide the position detecting unit 131, the region adjusting unit 132, and/or the display controlling unit 133.

Moreover, while in the present embodiment the explanation was for a case wherein the position detecting unit 131 detects the position of the dominant eye of the driver as the position of the eye DE, there is no limitation thereto. Instead the position detecting unit 131 may detect, for example, a central position of the two eyes as the position of the eye DE.

In addition, while the explanation in the present invention was for a case wherein the display 12 is mounted on the A-pillars 21, there is no limitation thereto. The display 12 need only be disposed in a position in the vehicle body 20 wherein the field of view of the driver is blocked. For example, the display 12 may be mounted on the B-pillars, or the like.

In addition, while the explanation in the present invention was for a case wherein the outside imaging cameras 111 are mounted on the A-pillars 21, there is no limitation thereto. The outside imaging cameras 111 need only be mounted at positions wherein it is possible to capture the outside image PQ.

Moreover, while in the present embodiment, when the position detecting unit 131 detects a change in the head position DH and in the position of the eye DE, the reference was the Y axis that is the front/rear direction of the vehicle 1 and the Y axis that is the crosswise direction of the vehicle 1, the X axis may be replaced with the U axis and the Y axis may be replaced with the V axis in detecting the change of the head position DH and the position of the eye DE.

Additionally, if the display controlling method according to the present invention is achieved using a computer, it may be structured in the form of a medium on which is recorded a control program 134 that is executed by a computer, or a transmission medium for transmitting the control program 134.

The recording medium may use a magnetic or optical recording medium, or a semiconductor memory device. Specifically, it may be a fixed recording medium or a portable recording medium such as a flexible disk, an HDD, a CD-ROM (Compact Disk Read-Only Memory), a DVD, a Blu-ray® disc, a magnetooptical disc, a flash memory, a card-type recording medium, or the like. Moreover, the recording medium may be a RAM, a ROM, or a non-volatile storage device, such as an HDD, provided by the display controlling device 13.

Additionally, the display controlling device 13 may download the control program 134 from a server device that is connected communicatively through a network to the display controlling device 13.

Moreover, the processing units in the flowchart shown in FIG. 4 are partitioned depending on the main processing details thereof to facilitate easy understanding of the processes of the display controlling device 13, for example, but the present invention is not limited by the names and ways in which the processing units are divided. The processes of the display controlling device 13 may be divided into more processing units depending on the process details. Moreover, the processes of the display controlling device 13 may instead be divided so as to include more processes in a single processing unit.

EXPLANATION OF REFERENCE SYMBOLS

1: Vehicle
11: Imaging Unit
111: Outside Imaging Camera
112: Driver Imaging Camera
12: Display
13: Display Controlling Device
13A: Processor
13B: Memory
131: Position Detecting Unit
132: Region Adjusting Unit
133: Display Controlling Unit
134: Control Program
DH: Head
DE: Eye
PE: Image
PD: Driver Image
PQ: Outside Image
R: Region

What is claimed is:

1. A display controlling device for displaying, on a display that is mounted on the interior of a vehicle, an image of outside of the vehicle so as to appear as if looking through the vehicle body of the vehicle, comprising:
   a position detecting unit for detecting a position of the head of the driver and a position of an eye of the driver;
   a region adjusting unit for adjusting a position of a region, of the image of the outside of the vehicle, displayed on the display, depending on a detection result by the position detecting unit; and
   a display controlling unit for displaying, on the display, an image corresponding to the region at the position adjusted by the region adjusting unit,
   wherein the region adjusting unit prevents adjustment of the position of the region to a position corresponding to a change of the position of the eye in a vertical direction and adjusts the position of the region to a position corresponding to a change of the position of the eye in the crosswise direction, when the position of the head has changed so as to move in both the vertical direction and the crosswise direction of the vehicle.

2. A display controlling device according to in claim 1, wherein when the position of the head has changed so as to move in both the vertical direction and the front/back direction of the vehicle, the region adjusting unit prevents adjustment of the position of the region to a position corresponding to the change, in the vertical direction, of the position of the eye, and adjusts the position of the region to a position corresponding to the change, in the front/back direction, of the position of the eye.

3. A display controlling device according to in claim 1, wherein the position detecting unit detects, as the position of the eye of the driver, the position of the dominant eye of the driver.

4. A display controlling device according to in claim 1, wherein when the position of the head has changed so as to move in the vertical direction of the vehicle and the crosswise direction of the vehicle, the region adjusting unit prevents adjustment of the position of the region to a position corresponding to the change, in the vertical direction, of the position of the eye, and adjusts the position of the region to a position corresponding to the change, in the crosswise direction, of the position of the eye.

5. A display controlling device according to in claim 1, wherein when the position of the head has changed so as to move in the vertical direction of the vehicle and the front/back direction of the vehicle, the region adjusting unit prevents adjustment of the position of the region to a position corresponding to the change, in the vertical direction, of the position of the eye, and adjusts the position of the region to a position corresponding to the change, in the front/back direction, of the position of the eye.

6. A display controlling device according to in claim 1, wherein the vehicle body includes an A-pillar; and the display includes a display mounted on the A-pillar.

7. A display controlling unit according to in claim 1, wherein when the driver has boarded the vehicle, the region adjusting unit does not prevent adjustment of the position of the region to a position corresponding with a change, in the vertical direction, of the position of the eye.

8. A display controlling method for a display controlling device for displaying, on a display that is mounted on the interior of a vehicle, an image of outside of the vehicle so as to appear as if looking through the vehicle body of the vehicle, including:

a detecting step for detecting a position of the head of the driver and a position of an eye of the driver;

an adjusting step for adjusting a position of a region, of the image of the outside of the vehicle, displayed on the display, depending on a detection result by the detecting step; and a displaying step for displaying, on the display, an image corresponding to the region at the position adjusted by the adjusting step, wherein when the position of the head has changed so as to move in both the vertical direction and the crosswise direction of the vehicle, the adjusting step prevents adjustment of the position of the region to a position corresponding to the change, in the vertical direction, of the position of the eye, and adjusts the position of the region to a position corresponding to the change, in the crosswise direction, of the position of the eye.

* * * * *